United States Patent
Zhou et al.

(10) Patent No.: US 10,442,616 B2
(45) Date of Patent: Oct. 15, 2019

(54) LOW-TEMPERATURE CONTAINER, LOW-TEMPERATURE TANK AND LOW-TEMPERATURE TANK TRUCK

(71) Applicants: Nantong CIMC Tank Equipment Co., Ltd, Jiangsu (CN); China International Marine Containers (Group) Ltd., Shenzhen, Guangdong (CN); CIMC Enric Investment Holdings (Shenzhen) Co., Ltd., Shenzhen, Guangdong (CN)

(72) Inventors: Xiaoxiang Zhou, Jiangsu (CN); Huanghe Quan, Jiangsu (CN); Qingguo Meng, Jiangsu (CN); Yongxin Luo, Jiangsu (CN); Chunrong Yao, Jiangsu (CN)

(73) Assignees: Nantong CIMC Tank Equipment Co., Ltd., Nantong, Jiangsu (CN); China International Marine Containers (Group) Ltd., Shenzhen, Guangdong (CN); CIMC Enric Investment Holdings (Shenzhen) Co., Ltd., Shenzhen, Guangdong (CN)

(*) Notice: Subject to any disclaimer, the term of this patent is extended or adjusted under 35 U.S.C. 154(b) by 38 days.

(21) Appl. No.: 15/317,664

(22) PCT Filed: Oct. 29, 2014

(86) PCT No.: PCT/CN2014/089830
§ 371 (c)(1),
(2) Date: Dec. 9, 2016

(87) PCT Pub. No.: WO2015/188572
PCT Pub. Date: Dec. 17, 2015

(65) Prior Publication Data
US 2017/0113869 A1   Apr. 27, 2017

(30) Foreign Application Priority Data

Jun. 13, 2014 (CN) .......................... 2014 1 0265498

(51) Int. Cl.
B65D 88/74 (2006.01)
B60P 3/22 (2006.01)
(Continued)

(52) U.S. Cl.
CPC .......... B65D 88/748 (2013.01); B60P 3/2295 (2013.01); B65D 88/128 (2013.01);
(Continued)

(58) Field of Classification Search
CPC .... B65D 88/748; B65D 88/128; B65D 90/02; B65D 90/08; B65D 90/12; B65D 90/028;
(Continued)

(56) References Cited

U.S. PATENT DOCUMENTS 3,782,128 A * 1/1974 Hampton ................ F17C 3/08
220/560.12
7,797,807 B2 * 9/2010 Ueda ..................... A47J 41/028
220/592.16

FOREIGN PATENT DOCUMENTS

CN       2451917      10/2001
CN     204078550       1/2005
(Continued)

OTHER PUBLICATIONS

Second Office Action issued the Russian Patent Office in application No. 2016151970/12(083258) dated Aug. 21, 2018.

*Primary Examiner* — Andrew D Perreault
(74) *Attorney, Agent, or Firm* — McDonnell Boehnen Hulbert & Berghoff LLP (57) ABSTRACT

A low-temperature container, low-temperature tank and low-temperature tank truck are provided. The low-tempera-
(Continued)

ture container includes a housing and an inner container disposed inside the housing through a support assembly. The support assembly includes two transverse support structures correspondingly disposed between the housing body and inner container body, and two longitudinal support structures respectively disposed between the outer sealing head and the inner sealing head located at ends. An central lines of the two longitudinal support structures and an central axis of the inner container are collinear, or the central lines of the two longitudinal support structures are parallel to the central axis of the inner container, and the longitudinal support structures may extend and retract in the longitudinal direction of the low-temperature container. The low-temperature container of the present disclosure has balanced support points and good heat insulation effect.

12 Claims, 5 Drawing Sheets (51) Int. Cl.
*B65D 90/12* (2006.01)
*B65D 88/12* (2006.01)
*B65D 90/08* (2006.01)
*B65D 90/02* (2019.01)
*F17C 1/12* (2006.01)
*F17C 13/00* (2006.01)

(52) U.S. Cl.
CPC ............. *B65D 90/02* (2013.01); *B65D 90/08* (2013.01); *B65D 90/12* (2013.01); *F17C 1/12* (2013.01); *F17C 13/00* (2013.01)

(58) Field of Classification Search
CPC . B65D 7/22; B60P 3/2295; F17C 1/12; F17C 13/00; F17C 2203/0626; Y10S 220/901; Y10S 220/918
USPC .............................................. 220/562, 560.1
See application file for complete search history.

(56) References Cited

FOREIGN PATENT DOCUMENTS

| | | | |
|---|---|---|---|
| CN | 2833316 | 11/2006 | |
| CN | CB 2833316 | 11/2006 | |
| CN | 202244799 | 5/2012 | |
| CN | 102865456 | 1/2013 | |
| CN | 102997034 | 3/2013 | |
| DE | 2708387 | 8/1978 | |
| DE | 2941859 | 4/1981 | |
| DE | 202005006023 | 7/2005 | |
| JP | 2014074452 | 4/2014 | |
| RU | 2021958 | 10/1994 | |
| WO | WO 2005100210 A1 * | 10/2005 | ............. B65D 88/18 |

* cited by examiner

LOW-TEMPERATURE CONTAINER, LOW-TEMPERATURE TANK AND LOW-TEMPERATURE TANK TRUCK

CROSS REFERENCE

This application is an U.S. national phase of International Application No. PCT/CN2014/089830, filed on Oct. 29, 2014, which is based upon and claims priority to Chinese Patent Application No. 201410265498.4, filed on Jun. 13, 2014, and the entire contents thereof are incorporated herein by reference.

TECHNICAL FIELD

The present disclosure relates to a low-temperature container, low-temperature tank and low-temperature tank truck for storing and transporting low-temperature liquid.

BACKGROUND

Storage and transportation equipment mainly includes a low-temperature tank truck including a low-temperature tank having a low-temperature container at home and abroad presently.

A conventional low-temperature container mainly includes a housing and an inner container disposed inside the housing via a supporting structure. The supporting structure commonly adopts eight-point supporting structure (i.e. including eight fiberglass support parts), drawstring supporting structure, boom structure, sling structure and so on. The above supporting structures have their own strong points and weaknesses respectively, however strength, heat conduction and temperature compensation should be considered. Concerning supporting structures of a mobile container, the following problems should be considered additionally: impact load, fatigue load, inertia force of liquid in the inner container and so on.

The strength and heat insulation are important issues for the low-temperature container. It is a major subject for study and discussion in the field that how to improve environmental protection and economic performance of the low-temperature storage and transportation equipment under the condition of ensuring the strength and heat insulation to meet a requirement of safety and reliability.

SUMMARY

In order to overcome a deficiency of the low-temperature container in the prior art, an object of the disclosure is to provide a low-temperature container having balanced support points and good heat insulation effect.

Another object of the present disclosure is to provide a low-temperature tank including the low-temperature container of the present disclosure.

A further object of the present disclosure is to provide a low-temperature tank truck including the low-temperature tank of the present disclosure.

In order to overcome above technical problem, the present disclosure adopts the following technical solution:

In one aspect, A low-temperature container including a housing includes a cylindrical housing body and two outer sealing heads at both ends of the housing body respectively; and an inner container disposed inside the housing through a support assembly and including a cylindrical inner container body and two inner sealing heads at both ends of the inner container body respectively. wherein, the support assembly includes two transverse support structures correspondingly disposed in an interlayer between the housing body and inner container body; and two longitudinal support structures respectively disposed between the outer sealing head and the inner sealing head located at ends; an central lines of the two longitudinal support structures and an central axis of the inner container are collinear, or the central lines of the two longitudinal support structures are parallel to the central axis of the inner container, and the longitudinal support structures may extend and retract in the longitudinal direction of the low-temperature container.

In an embodiment of the present disclosure, wherein the two transverse support structures are relatively arranged left and right or up and down in the low-temperature container.

In an embodiment of the present disclosure, wherein the two transverse support structures are at a middle position of the low-temperature container or off a middle position of the low-temperature container.

In an embodiment of the present disclosure, wherein the transverse support structure includes a housing support part fixed to an inner wall of the housing body; an inner container support part fixed to an outer wall of the inner container body and corresponding to the housing support part; a support ring fixed to the housing support part at one end and extending to the inner container support part at the other end; and a heat shield block disposed between the inner container support part and the support ring.

In an embodiment of the present disclosure, wherein the heat shield block is formed by fiberglass or carbon fiber material.

In an embodiment of the present disclosure, wherein the housing support part includes a fix ring fixed to the housing body; and a support plate fixed to an inner wall of the fix ring.

In an embodiment of the present disclosure, wherein the fix ring of the housing support part is in a conical cylinder shape.

In an embodiment of the present disclosure, wherein the support plate is in a circular plate shape or rectangle plate shape; and the support plate is provided with a through hole at the center.

In an embodiment of the present disclosure, wherein the inner container support part includes a bowl-shaped fix plate having a bottom wall and a side wall bending and extending from the bottom wall to one side; the side wall of the fix plate is fixed to the inner container body, and the bottom wall is embedded into the inner container; the bottom wall and side wall encompass to define a receiving space in which the support ring extends and enters; and a gap exists between the support ring and the bottom wall of the fix plate.

In an embodiment of the present disclosure, wherein the side wall of the fix plate is cylinder, and an inner diameter of the side wall of the fix plate is 10%-30% of that of the cylindrical inner container body.

In an embodiment of the present disclosure, wherein the side wall of the fix plate is provided with a recess for fixing the heat shield block.

In an embodiment of the present disclosure, wherein the longitudinal support structure includes a first support structure fixed to the outer sealing head; and a second support structure fixed to the inner sealing head and axil movable relative to the first support structure.

In an embodiment of the present disclosure, wherein the first support structure includes an outer sealing head connect cylinder and a heat insulation ring, the outer sealing head connect cylinder is fixed to an inner wall of the outer sealing head at one end, and extends to the inner sealing head at the other end, and a gap exists between the other end of the outer sealing head connect cylinder and the inner sealing head.

In an embodiment of the present disclosure, wherein the second support structure includes an inner sealing head connect cylinder, the inner sealing head connect cylinder is fixed to an outer wall of the inner sealing head at one end and corresponding to the outer sealing head connect cylinder, and extends to the outer sealing head at the other end, a gap exists between the other end of the inner sealing head connect cylinder and the outer sealing head; the heat insulation ring is mounted to the outer sealing head connect cylinder at the outer wall, contacts and matches the outer wall of the inner sealing head connect cylinder at the inner wall.

In an embodiment of the present disclosure, wherein the inner wall of the outer sealing head connect cylinder is provided with a ring-shaped recess for mounting the insulation ring.

In an embodiment of the present disclosure, wherein a baffle ring is formed at the end of the outer sealing head connect cylinder which prevents the heat insulation ring running away.

In an embodiment of the present disclosure, wherein the insulation ring is formed by fiberglass or carbon fiber material.

In another aspect, a low-temperature tank including a frame and a low-temperature container according to present disclosure fixed to the frame.

In a further aspect, a low-temperature tank truck including a carriage and a low-temperature tank according to claim 18 disposed on the carriage.

It can be seen from the above technical solution that the present disclosure has at least positive effects and advantages as follow:

In the low-temperature container according to the present disclosure, the support assembly includes two transverse support structures relatively arranged between the housing body and inner container body and two longitudinal support structures disposed between corresponding outer sealing head and inner sealing head. The low-temperature container according to the present disclosure has less support points, i.e., four support points, with ensuring the support strength between the housing body and inner container body, such that heat transferred from the inner container to the housing may be reduced. Especially, heat insulation structures are provided in both longitudinal support structures and transverse support structures, which may further reduce heat transmission. Therefore, the low-temperature container of the present disclosure has good heat insulation effect.

When the inner container sharply contracts as the low-temperature liquid is filled, or sharply expand as the low-temperature liquid is poured, the longitudinal support structure correspondingly connected between the inner and outer sealing heads may extend and retract in the longitudinal direction of the low-temperature container, thus compensating the dimension variation of the inner container due to the heat-expansion and cold-contraction. Especially, the two longitudinal support structures are disposed at both ends of the low-temperature container respectively, and enables the inner container freely extend and retract at both ends relative to the housing, which avoids damage for the inner container and housing due to the heat-expansion and cold-contraction, thus helping to prolong service life.

DETAILED DESCRIPTION

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

Embodiment 1 of the Low-Temperature Container

Figure 1A:
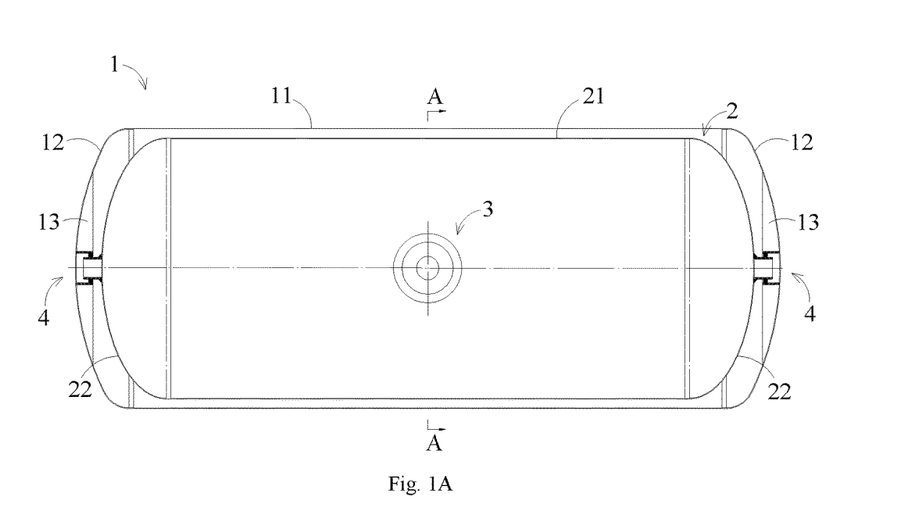
FIG. 1A is a schematic view of a low-temperature container according to a first embodiment of the present disclosure.
Figure 1B:
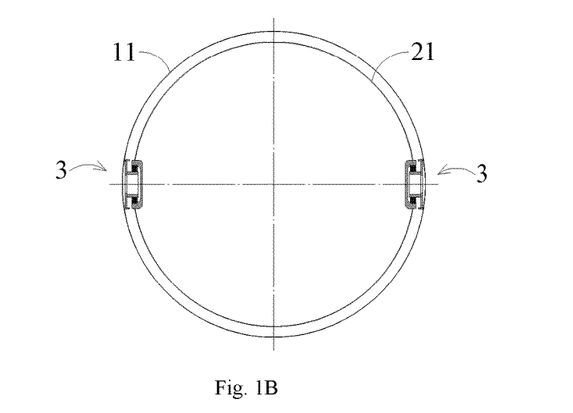
FIG. 1B is a cross-section view along a line A-A in FIG. 1A.

As shown in FIGS. 1A and 1B, the low-temperature container according to the first embodiment of the present disclosure includes a housing 1 and an inner container 2 coaxially disposed inside the housing 1 through a support assembly.

The housing 1 includes a cylindrical housing body 11 and two outer sealing heads 12 at both ends of the housing body 11 respectively. The inner container 2 includes a cylindrical inner container body 21 and two inner sealing heads 22 at both ends of the inner container body 21 respectively.

The support assembly includes two transverse support structures 3 and two longitudinal support structures 4.

The transverse support structure 3 is disposed in an interlayer between the housing body 11 and inner container body 21. Force suffered by the inner container 2 from all directions is transmitted to the housing 1 through the transverse support structure 3. The transverse support structure 3 may extend and retract so as to adapt radial dimension of the inner container 2 which may be changed due to the heat-expansion and cold-contraction when filling low-temperature liquid. In case that the volume of the low-temperature container is relative small, the length of the transverse support structure 3 may be unadjustable. The two transverse support structures are relatively arranged left and right at the middle of the low-temperature container. The two transverse support structures may support the inner container 2 and bear longitudinal force generated by the inner container 2 during movement (e.g. a force generated when emergency brake), and prevent relative rotation between the housing 1 and the inner container 2. Radial loads of the two transverse support structures 3 especially relatively arranged left and right are substantially the same, that is, support forces applied by the two transverse support structures 3 to the inner container 2 are uniform.

Figure 2:
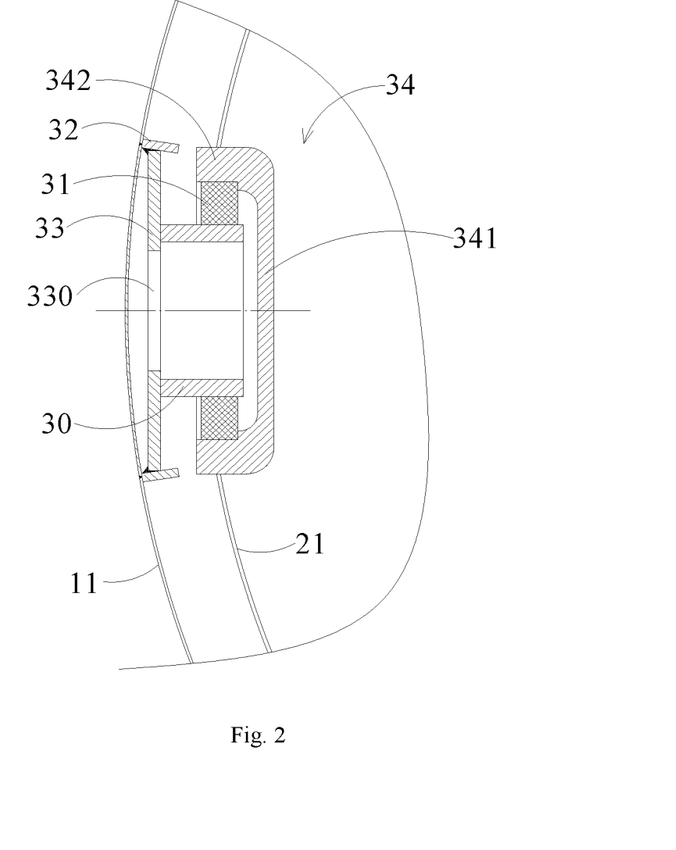
FIG. 2 is an enlarged cross-section view of a transverse support structure in the low-temperature container according to the first embodiment of the present disclosure.

As shown in FIG. 2, the transverse support structure 3 includes a housing support part, an inner container support part, a support ring 30 and a heat shield block 31.

The housing support part is fixed to the housing body 11 and has a structure, for example including a fix ring 32 welded to the housing body 11 and a support plate 33 welded to an inner wall of the fix ring 32.

The fix ring 32 is in a flat conical cylinder shape in order to increase area welded to the housing body 11 as large as possible, which may enhance the connection strength between the fix ring 32 and the housing body 11. Of course, the shape of the fix ring 32 is not limited to flat conical cylinder, any other shape may be adaptable, such as straight cylinder.

Figure 3:
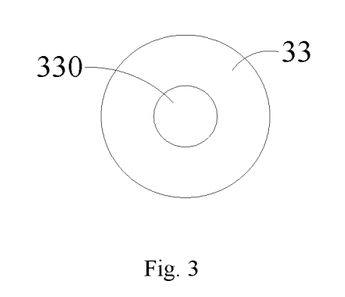
FIG. 3 is an schematic view of a circular supporting plate of the transverse support structure in the low-temperature container according to the first embodiment of the present disclosure.
Figure 4:
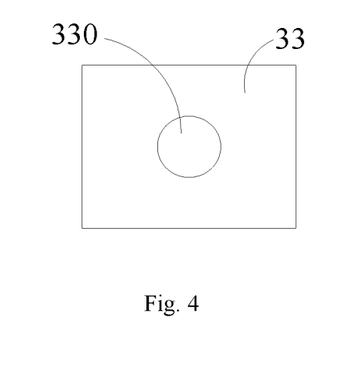
FIG. 4 is an schematic view of a rectangle supporting plate of the transverse support structure in the low-temperature container according to the first embodiment of the present disclosure.

As shown in FIGS. 3 and 4, the support plate 33 is in a circular plate shape, and other shape may be adaptable, such as rectangle plate shape. A through hole 330 is defined at the center of the support plate 33, through which heat insulation material may be filled so as to improve heat insulation performance of the present disclosure.

The housing support part according to the first embodiment of the present disclosure may increase heat conduction approach and decrease heat leakage. As shown in FIG. 2, the inner container support part includes a bowl-shaped fix plate 34. The fix plate 34 has a bottom wall 341 and a side wall 342 bending and extending from the bottom wall 341 to one side. The inner diameter of the side wall 342 is 20% of that of the cylindrical inner container body 21, which is not limited thereto, and it is adaptable that the inner diameter of the side wall 342 is 10%-30% of that of the cylindrical inner container body 21. The side wall 342 of the fix plate 34 is welded to the inner container body 21, and the bottom wall 341 of the fix plate 34 is embedded into the inner container 2. Therefore, the support structures 3 may be designed in a relative small volume while ensuring good connection strength. In particular, in the support structure 3, a distance from the bottom wall 341 of the fix plate 34 to a connecting point between the fix ring 32 and the housing body 11 is relative small, consequently, the volume of the inner container 2 may be increased as large as possible under a condition of ensuring the volume of the housing 1 to meet standard.

The bottom wall 341 and side wall 342 of the bowl-shaped fix plate 34 encompass to define a receiving space in which the support ring 30 extends and enters. A gap exists between the support ring 30 and the bottom wall 341 of the fix plate 34. Therefore, it is possible to avoid direct heat transmission between the fix plate 34 and the fix ring 32, i.e., avoid direct heat transmission between the inner container support part fixed in the inner container 2 and the housing support part fixed in the housing 1, thus helping to improve heat insulation property of the low-temperature container. A recess is provided at the side wall 342 of the bowl-shaped fix plate 34, in which the heat shield block 31 is embedded and fixed.

The heat shield block 31 may be formed by good heating-insulating material, such as fiberglass or carbon fiber material. The heat shield block 31 is annular, surrounds and matches the periphery of the support ring 30. The heat shield block 31 may also be in other shape, such as half-annular shape to match the lower part of the periphery of the support ring 30.

Figure 5:
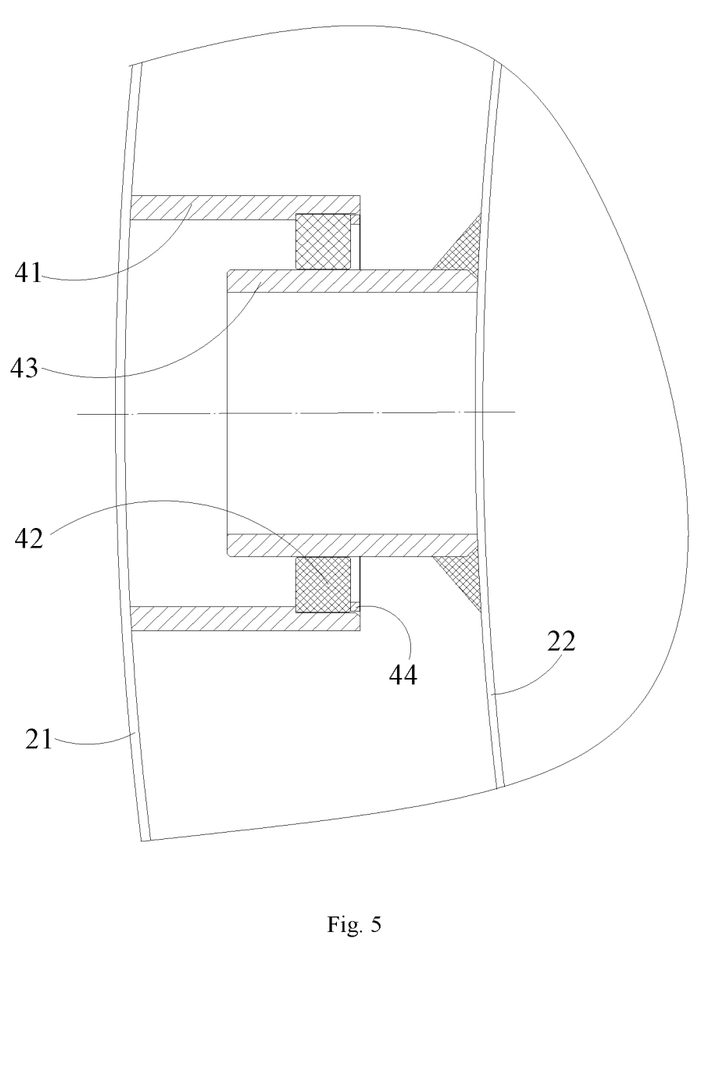
FIG. 5 is an enlarged cross-section view of a longitudinal support structure in the low-temperature container according to the first embodiment of the present disclosure.

As shown in FIG. 5, the longitudinal support structure 4 includes a first support structure and a second support structure.

The first support structure includes an outer sealing head connect cylinder 41 and a heat insulation ring 42. The outer sealing head connect cylinder 41 is fixed to an inner wall of the outer sealing head 12 at one end, and extends to the inner sealing head 22 at the other end. A gap exists between the other end of the outer sealing head connect cylinder 41 and the inner sealing head 22 so as to avoid direct heat transmission between the inner sealing head 22 and the outer sealing head 12, thus helping to improve heat insulation property of the low-temperature container.

The second support structure includes an inner sealing head connect cylinder 43. The inner sealing head connect cylinder 43 is fixed to an outer wall of the inner sealing head 22 at one end with corresponding to the outer sealing head connect cylinder 41, and extends to the outer sealing head 12 at the other end. A gap exists between the other end of the inner sealing head connect cylinder 43 and the outer sealing head 12 so as to avoid direct heat transmission between the inner sealing head 22 and the outer sealing head 12. In the embodiment, the inner sealing head connect cylinder 43 has a diameter smaller than that of the outer sealing head connect cylinder 41 so as to extends into the outer sealing head connect cylinder 41. In other embodiments, it is feasible that the inner sealing head connect cylinder 43 is designed to have a diameter larger than that of the outer sealing head connect cylinder 41. The heat insulation ring 42 may be formed by good heating-insulating material, such as fiberglass or carbon fiber material. The heat insulation ring 42 is mounted to the outer sealing head connect cylinder 41 at the outer wall, contacts and matches the outer wall of the inner sealing head connect cylinder 43 at the inner wall, and is movable relative to the inner sealing head connect cylinder 43.

A ring-shaped recess is provided at the inner wall of the outer sealing head connect cylinder 41, in which the heat insulation ring 42 is embedded and fixed. Furthermore, a baffle ring 44 may be formed at the end the outer sealing head connect cylinder 41 which prevents the heat insulation ring 42 running away.

In other embodiments, the shape of the longitudinal support structure 4 is not limited thereto, and may be various, any other shape capable of extending and retracting in the longitudinal direction of the low-temperature container (i.e., in axial) is adaptable for the disclosure. Generally, since the longitudinal dimension is much larger than the transverse dimension of the low-temperature container, the longitudinal dimension has a larger variation relative to the transverse dimension due to the heat-expansion and cold-contraction when filling low-temperature liquid. Therefore, the longitudinal support structure 4 may be designed that its dimension variation is larger than that of the transverse support structure 3.

In the first embodiment, the two transverse support structures are symmetrical with respect to the longitudinal center plane of the low-temperature container, and the two longitudinal support structures are symmetrical with respect to the transverse center plane of the low-temperature container. Therefore, there are four support points between the housing and the inner container in the low-temperature container, which may provide balanced support, and ensure the housing and the inner container to be uniformly forced, thus helping to prolong service life.

Embodiment 2 of the Low-Temperature Container

Figure 6:
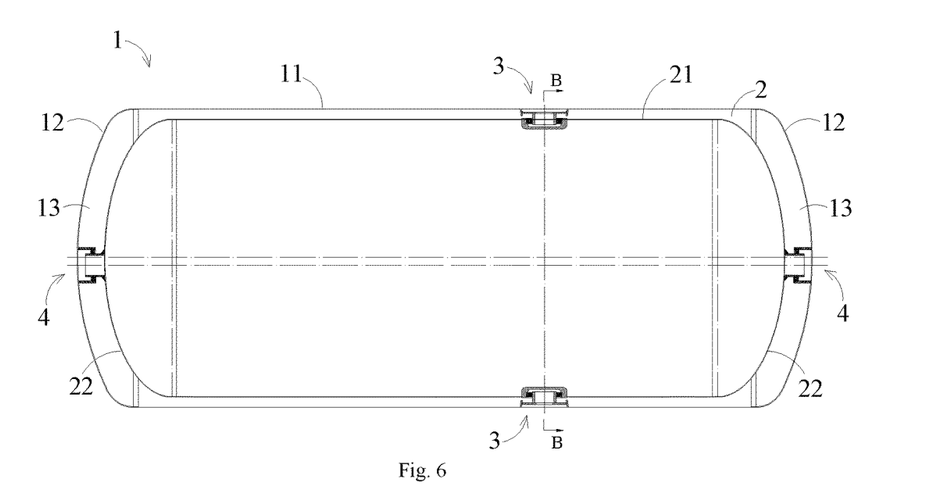
FIG. 6 is a schematic view of a low-temperature container according to a second embodiment of the present disclosure.
Figure 7:
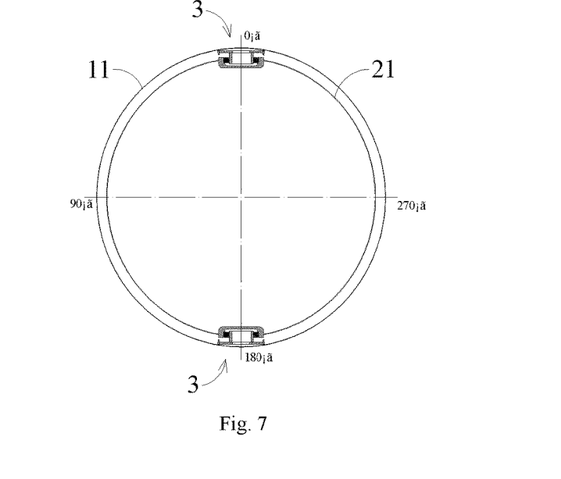
FIG. 7 is a cross-section view along a line B-B in FIG. 6.

With reference to FIGS. 6 and 7 that show the low-temperature container according to the second embodiment of the present disclosure which is different from t the first embodiment mentioned in that:

The two transverse support structures are relatively arranged up and down and at a position off the middle position of the low-temperature container.

Other parts of the low-temperature container according to the second embodiment are the same as that of the first embodiment mentioned above and the detailed description is omitted herein.

Low-Temperature Tank

A low-temperature tank of the present disclosure includes a frame and the low-temperature container according to the present disclosure fixed to the frame.

Low-Temperature Tank Truck

A low-temperature tank truck of the present disclosure includes a carriage and the low-temperature tank according to the present disclosure disposed on the carriage.

INDUSTRIAL APPLICABILITY

In the low-temperature container according to the present disclosure, the support assembly includes two transverse support structures relatively arranged between the housing body and inner container body and two longitudinal support structures disposed between corresponding outer sealing head and inner sealing head. The low-temperature container according to the present disclosure has less support points, i.e., four support points, with ensuring the support strength between the housing body and inner container body, such that heat transferred from the inner container to the housing may be reduced. Especially, heat insulation structures are provided in both longitudinal support structures and transverse support structures, which may further reduce heat transmission. Therefore, the low-temperature container of the present disclosure has good heat insulation effect. In the present disclosure, the two longitudinal support structures are disposed at both ends of the low-temperature container respectively, and enables the inner container freely extend and retract at both ends relative to the housing, which avoids damage for the inner container and housing due to the heat-expansion and cold-contraction, thus helping to prolong service life.

It should be noted that the above embodiments are only illustrated for describing the technical solution of the disclosure and not restrictive, and although the embodiments are described in detail by referring to the aforesaid embodiments, the skilled in the art should understand that the aforesaid embodiments can be modified and portions of the technical features therein may be equally changed, which does not depart from the spirit and scope of the technical solution of the embodiments of the disclosure.

What is claimed is:

1. A low-temperature container comprising:
   a housing comprising a cylindrical housing body and two outer sealing heads at both ends of the housing body respectively; and
   an inner container disposed inside the housing through a support assembly and comprising a cylindrical inner container body and two inner sealing heads at both ends of the inner container body respectively;
   wherein, the support assembly includes four support structures: two transverse support structures, and two longitudinal support structures wherein the longitudinal support structures further comprise a first support structure fixed to the outer sealing head, the first support structure comprises an outer sealing head connect cylinder and a heat insulation ring, the outer sealing head connect cylinder is fixed to an inner wall of the outer sealing head at one end, and extends to the inner sealing head at the other end, and a gap exists between the other end of the outer sealing head connect cylinder and the inner sealing head; and a second support structure fixed to the inner sealing head the second support structure comprises an inner sealing head connect cylinder, the inner sealing head connect cylinder is fixed to an outer wall of the inner sealing head at one end and corresponding to the outer sealing head connect cylinder, and extends to the outer sealing head at the other end, a gap exists between the other end of the inner sealing head connect cylinder and the outer sealing head; the heat insulation ring is mounted to the outer sealing head connect cylinder at the outer wall, contacts and matches the outer wall of the inner sealing head connect cylinder at the inner wall, and the second support structure is movable relative to the first support structure along an axil direction of the first support structure and wherein a baffle ring is formed at the end of the outer sealing head connect cylinder to prevent the heat insulation ring running away,
   the two transverse support structures correspondingly disposed in an inter layer between the housing body and inner container body;
   the two longitudinal support structures respectively disposed between the outer sealing head and the inner sealing head located at ends; wherein central lines of the two longitudinal support structures and a central axis of the inner container are collinear, or the central lines of the two longitudinal support structures are parallel to the central axis of the inner container, and the longitudinal support structures may extend and retract in the longitudinal direction of the low-temperature container.

2. The low-temperature container according to claim 1, wherein the two transverse support structures are relatively arranged left and right or up and down in the low-temperature container.

3. The low-temperature container according to claim 2, wherein the two transverse support structures are at a middle position of the low-temperature container or off a middle position of the low-temperature container.

4. The low-temperature container according to claim 1, wherein the transverse support structure comprises:
   a housing support part fixed to an inner wall of the housing body;
   an inner container support part fixed to an outer wall of the inner container body and corresponding to the housing support part;
   a support ring fixed to the housing support part at one end and extending to the inner container support part at the other end; and
   a heat shield block disposed between the inner container support part and the support ring.

5. The low-temperature container according to claim 4, wherein the heat shield block is formed by fiberglass or carbon fiber material.

6. The low-temperature container according to claim 4, wherein the housing support part comprises:
   a fix ring fixed to the housing body; and
   a support plate fixed to an inner wall of the fix ring.

7. The low-temperature container according to claim 6, wherein the fix ring of the housing support part is in a conical cylinder shape.

8. The low-temperature container according to claim 6, wherein the support plate is in a circular plate shape or rectangle plate shape; and the support plate is provided with a through hole at the center.

9. The low-temperature container according to claim 4, wherein the inner container support part comprises a bowl-shaped fix plate having a bottom wall and a side wall bending and extending from the bottom wall to one side; the side wall of the fix plate is fixed to the inner container body, and the bottom wall is embedded into the inner container; the bottom wall and side wall encompass to define a receiving space in which the support ring extends and enters; and a gap exists between the support ring and the bottom wall of the fix plate.

10. The low-temperature container according to claim 9, wherein the side wall of the fix plate is cylinder, and an inner diameter of the side wall of the fix plate is 10%-30% of that of the cylindrical inner container body.

11. The low-temperature container according to claim 9, wherein the side wall of the fix plate is provided with a recess for fixing the heat shield block.

12. The low-temperature container according to claim 1, wherein the inner wall of the outer sealing head connect cylinder is provided with a ring-shaped recess for mounting the heat insulation ring.

\* \* \* \* \*